(12) United States Patent
Ungar et al.

(10) Patent No.: US 12,540,972 B2
(45) Date of Patent: Feb. 3, 2026

(54) SYSTEMS AND METHODS FOR JITTER INJECTION WITH PRE- AND POST-EMPHASIS CIRCUITS IN AUTOMATIC TESTING EQUIPMENT (ATE)

(71) Applicant: A.T.E. SOLUTIONS, INC., El Segundo, CA (US)

(72) Inventors: Louis Yehuda Ungar, Playa del Rey, CA (US); Tak Ming Mak, Union City, CA (US); Neil Glenn Jacobson, Los Altos, CA (US)

(73) Assignee: A.T.E. SOLUTIONS, INC., El Segundo, CA (US)

( * ) Notice: Subject to any disclaimer, the term of this patent is extended or adjusted under 35 U.S.C. 154(b) by 588 days.

(21) Appl. No.: 17/953,158

(22) Filed: Sep. 26, 2022

(65) Prior Publication Data

US 2023/0099768 A1    Mar. 30, 2023

Related U.S. Application Data

(60) Provisional application No. 63/248,269, filed on Sep. 24, 2021.

(51) Int. Cl.
*G01R 31/317*    (2006.01)

(52) U.S. Cl.
CPC . *G01R 31/31713* (2013.01); *G01R 31/31709* (2013.01)

(58) Field of Classification Search
CPC ............... G01R 31/31713; G01R 31/31709
See application file for complete search history.

(56) References Cited

U.S. PATENT DOCUMENTS

| | | | |
|---|---|---|---|
| 7,287,200 B2 | 10/2007 | Miyaji | |
| 7,536,621 B2 | 5/2009 | Pane et al. | |
| 7,936,809 B2 | 5/2011 | Daxer et al. | |
| 8,006,141 B2 | 8/2011 | Stephens et al. | |
| 8,045,605 B2 * | 10/2011 | Ichiyama | G01R 31/31709 375/226 |
| 8,073,043 B2 | 12/2011 | Liu et al. | |
| 8,169,225 B2 | 5/2012 | Schuttert | |
| 8,504,882 B2 | 8/2013 | Li et al. | |
| 9,088,399 B1 * | 7/2015 | Poon | H04L 1/243 |
| 9,222,972 B1 | 12/2015 | Ding et al. | |
| 10,084,591 B1 | 9/2018 | Palusa et al. | |
| 2007/0080752 A1 * | 4/2007 | Smith | H03L 7/099 331/16 |

(Continued)

FOREIGN PATENT DOCUMENTS

CA    2628268    5/2007

*Primary Examiner* — Lisa M Caputo
*Assistant Examiner* — Sharah Zaab
(74) *Attorney, Agent, or Firm* — Mannava & Kang, P. C.

(57) ABSTRACT

A system and method for jitter injection is provided. The system may include a serializer-deserializer (SerDes) circuit. In some examples, the serializer-deserializer (SerDes) circuit have a pre-emphasis circuit and a post emphasis circuit. The system may also include a controller, which may be used to apply specific and varying amounts of pre-emphasis and post-emphasis. The system may also include a jitter injector. In some examples, the jitter injector may be used to inject jitter into the serializer-deserializer (SerDes) circuit based on the applied pre-emphasis and post-emphasis.

19 Claims, 9 Drawing Sheets

(56) References Cited

U.S. PATENT DOCUMENTS

| | | | |
|---|---|---|---|
| 2008/0013609 A1* | 1/2008 | Daxer | H04L 1/205 |
| | | | 375/221 |
| 2008/0240212 A1* | 10/2008 | Satou | H04L 1/24 |
| | | | 714/704 |
| 2012/0072784 A1* | 3/2012 | Li | G06F 11/267 |
| | | | 714/704 |
| 2014/0098843 A1 | 4/2014 | Kong | |

* cited by examiner

SYSTEMS AND METHODS FOR JITTER INJECTION WITH PRE- AND POST-EMPHASIS CIRCUITS IN AUTOMATIC TESTING EQUIPMENT (ATE)

PRIORITY

This patent application claims priority to U.S. Provisional Patent Application No. 63/248,269, entitled "Systems and Methods for Jitter Injection with Pre- and Post-Emphasis Circuits in Automatic Testing Equipment (ATE)", filed on Sep. 24, 2021.

TECHNICAL FIELD

This patent application is directed to instrumentation for testing circuits and electronic equipment, and more specifically, to systems and methods for jitter injection with pre- and post-emphasis circuits in automatic testing equipment (ATE).

BACKGROUND

As electronic and communications technologies continue to advance, testing and measuring various electronic devices are becoming more and more important. A transceiver in a serializer-deserializer (SerDes) circuit used for high-speed data transmission, for example, may involve many complex components and processes. For instance, such a transceiver may include an equalization circuit, a clock recovery circuit, an amplifier, a data sampler, and other adjustment circuits. In order to perform and function well, the transceiver may be required to tolerate a fair amount of jitter. As a result, it may be desirable to perform any number of jitter testing techniques that are accurate, efficient, reliable, and cost-effective.

BRIEF DESCRIPTION OF DRAWINGS

Features of the present disclosure are illustrated by way of example and not limited in the following Figure(s), in which like numerals indicate like elements, in which.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As electronic and data communications technologies continue to advance, testing and measuring various electronic and data communications devices are becoming more and more important. As described above, test instrumentation using jitter injection may be used to test performance and function of any number of transceivers, transmitters, and/or receivers. In some examples, a transceiver in a serializer-deserializer (SerDes) circuit may be used for high-speed data transmission and may involve many complex components and processes. For instance, such a transceiver may include an equalization circuit, a clock recovery circuit, an amplifier, a data sampler, and other adjustment circuits. In order to perform and function well, the transceiver may be required to tolerate a fair amount of jitter. Thus, it may be desirable to perform any number of jitter testing techniques that are accurate, efficient, reliable, and cost-effective.

Figure 1:
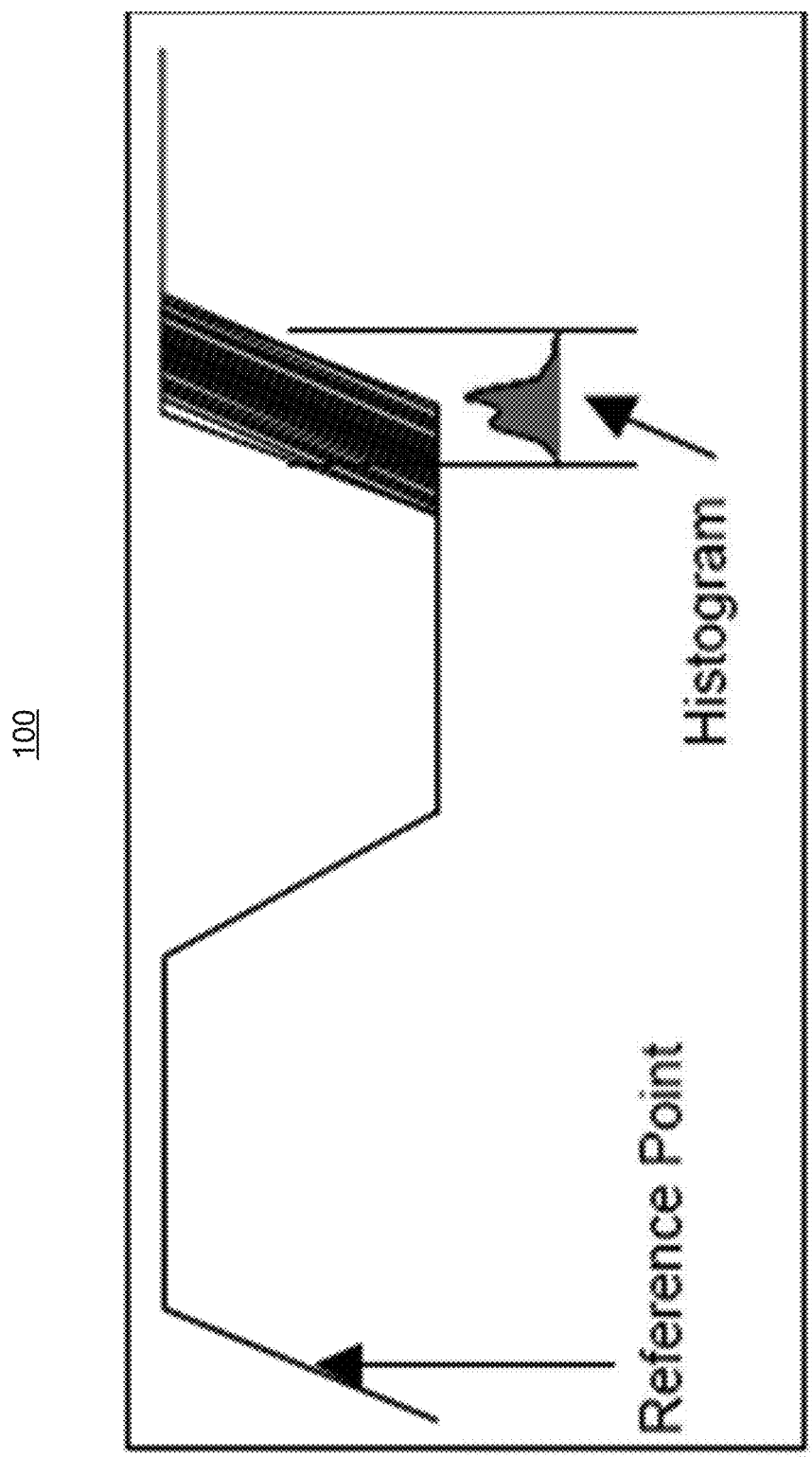
FIG. 1 illustrates a histogram of jitter in a test environment, according to an example.
Figure 7A:
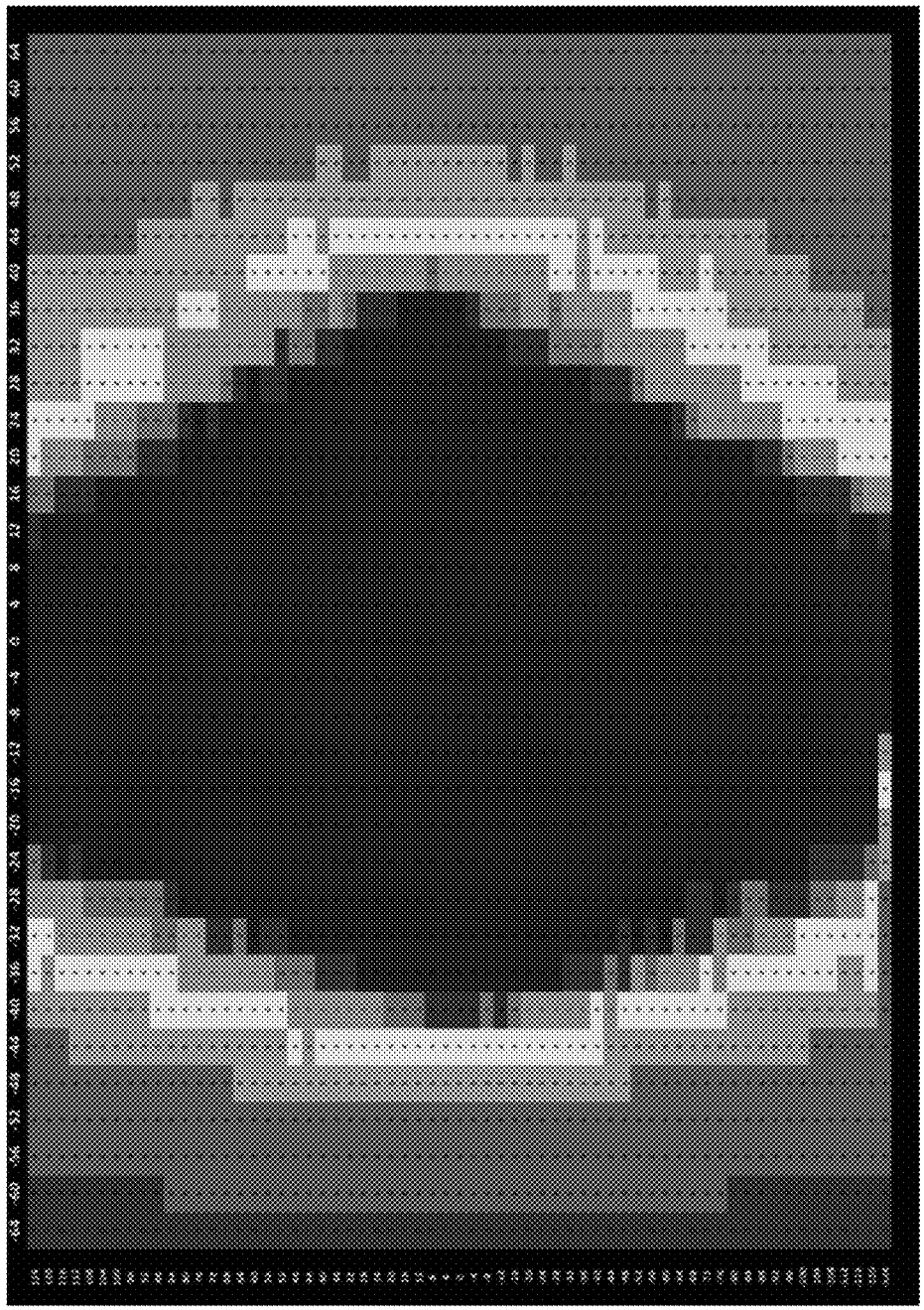
FIGS. 7A-7B illustrates eye diagrams with and without jitter injection, according to an example.
Figure 7B:
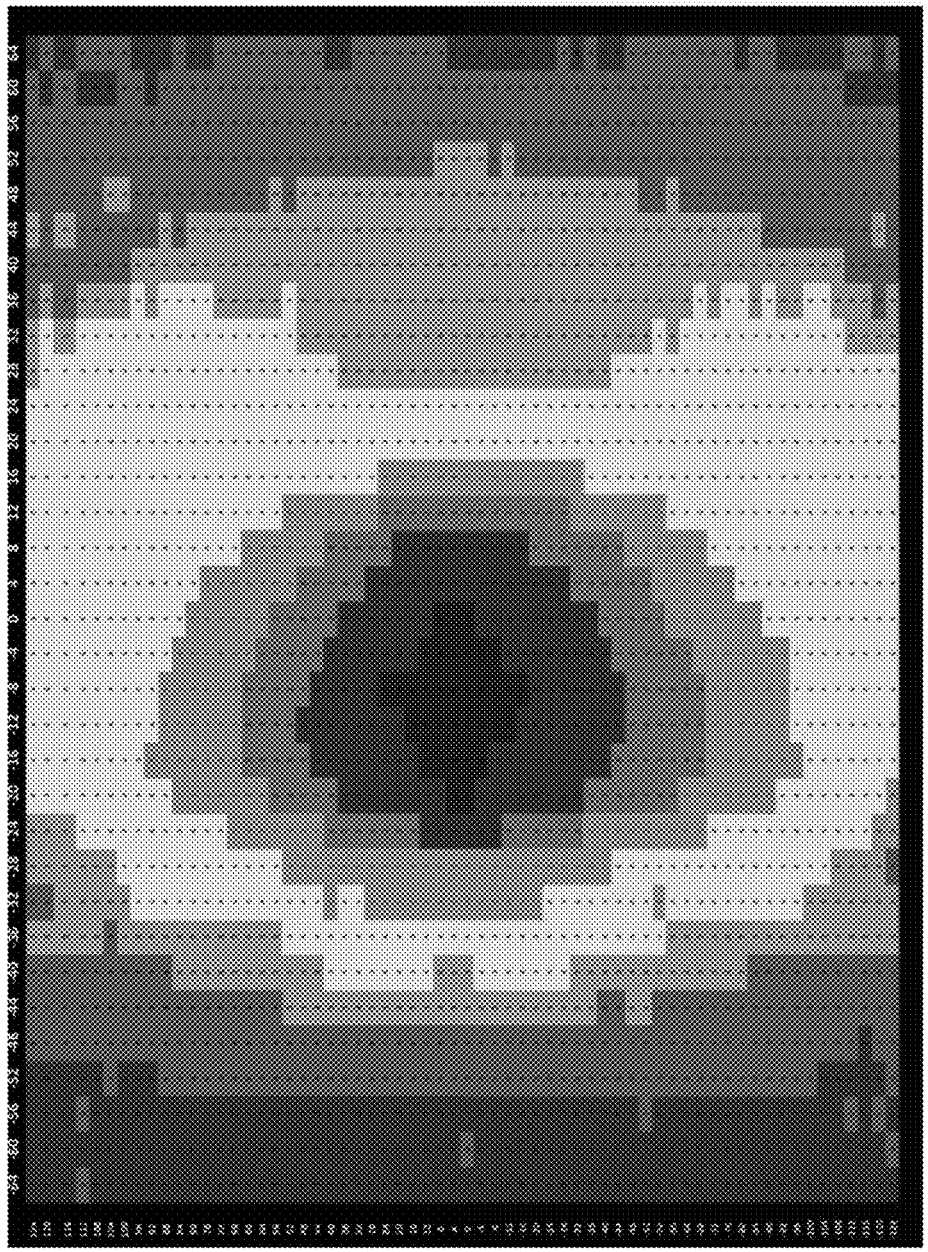

Jitter, as used herein, may refer to the noise of a high speed digital signal in which transmitted data edges may move back and forth (e.g., shifted phase) from cycle to cycle. FIG. 1 illustrates a histogram 100 of jitter in a test environment, according to an example. As shown, jitter may be seen at a rising edge in FIG. 1. In some examples, jitter may be measured using an eye diagram, examples of which are depicted in FIGS. 7A-7B described below. It should be appreciated that jitter may be a result of data itself, various transmitter/receiver characteristics, power noise coupling, clock noise, excessive losses from the transmission/reception media (e.g., the cables or connectors used), or other source of jitter. In some examples, jitter may be random or periodic in nature, depending on its cause or source.

Figure 2:
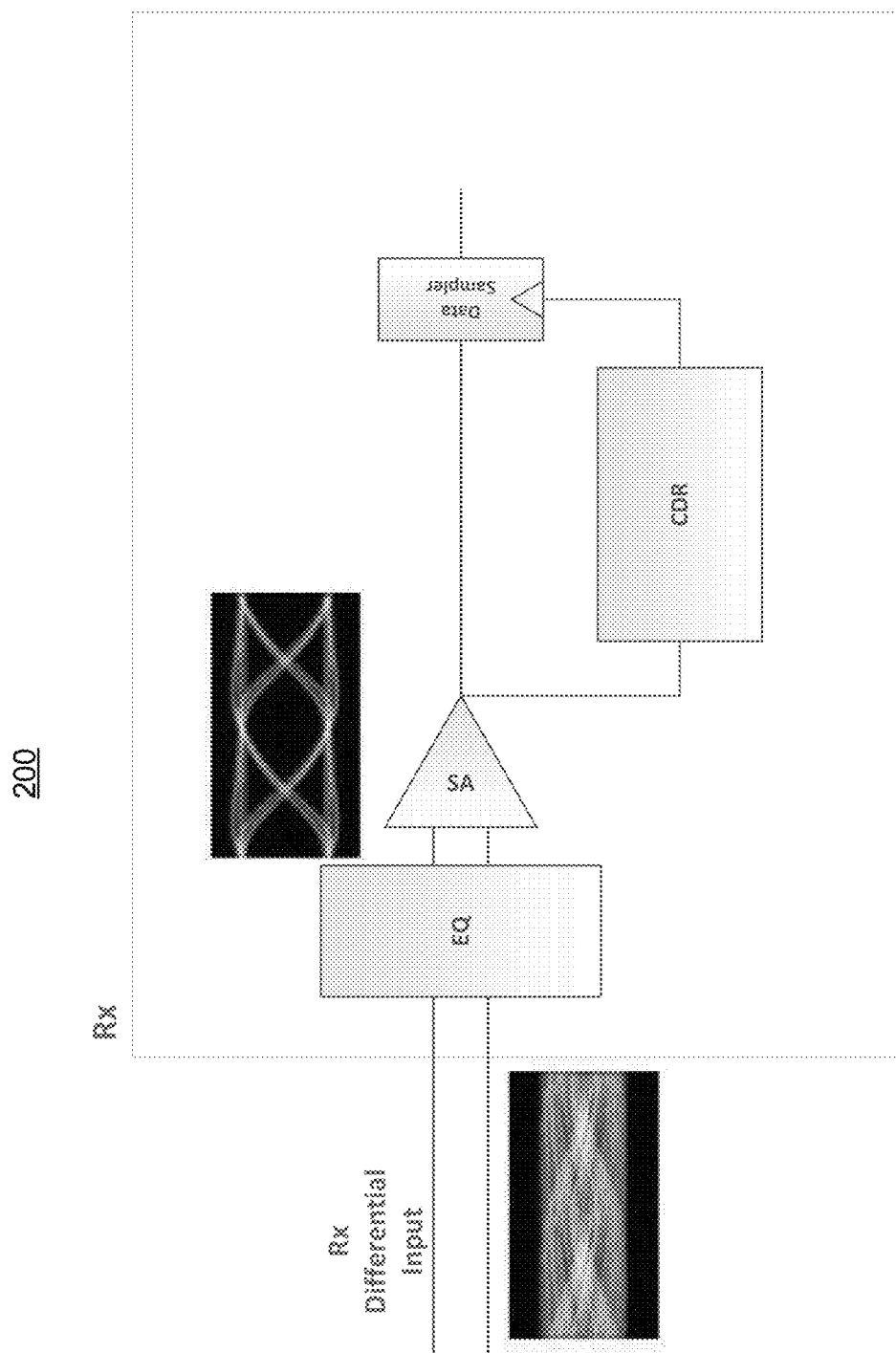
FIG. 2 illustrates a block diagram of a test instrument for using a transceiver for high-speed data transmission, according to an example.

FIG. 2 illustrates a block diagram 200 of a test instrument for using a transceiver for high-speed data transmission, according to an example. As shown, FIG. 2 may represent an eye diagram of a jittery input at the differential input to a receiver (Rx). In some examples, a receiver (Rx) in a serializer-deserializer (SerDes) circuit, for instance, used for high-speed data transmission may be complex. The receiver (Rx) may include any number of components, such as a complex set of circuits. For instance, the receiver (Rx) may include an Equalization (EQ), a Clock and Data-Recovery (CDR), a sense amplifier (SA), and a data sampler, as shown.

The equalization (EQ) circuit may be dynamically equalizable. In some examples, the equalization (EQ) circuit may, among other things, divide a signal into separate and distinct frequency bands where each band may have independent gain control. In this way, the equalization (EQ) circuit may compensate for high frequency losses, distortions of signals, or other similar effect.

Clock recovery may be used in systems communicating over wires, optical fibers, or by radio. The clock data recovery (CDR) circuit, described herein, may implement a process of extracting timing information from a serial data stream, for example, to allow a receiving circuit to decode transmitted symbols. In some examples, especially high-speed serial data streams, the clock data recovery (CDR) circuit may use a phase-locked loop (PLL)/delay-locked loop (DLL). In some examples, the clock data recovery (CDR) circuit may regenerate a clock from the incoming data stream. In other words, in scenarios where high-speed serial data streams are sent without an accompanying clock signal, a receiver (Rx) may generate a clock from an approximate frequency reference, and then phase-align a clock to transitions in the data stream with a phase-locked loop (PLL), delay-locked loop (DLL), or oversampling.

The sense amplifier (SA), which in some examples may be a finely tuned differential amplifier, may resolve digital bits from small differential signals. The data sampler may be a latch that uses the recovered clock from the clock-data recovery (CDR) circuit to sample the recovered data. It should be appreciated that other latency adjustment circuits may also be provided.

In some scenarios, the receiver (Rx) may utilize serial-to-parallel conversion to achieve high speeds. As mentioned above, the receiver (Rx) may also be designed to tolerate a fair amount of jitter introduced as a result of signal degradation through the transmitting media (e.g., cable and connectors). In order to test for the proper functioning of the receiver (Rx) circuit, a controlled amount of jitter may be injected into the test signal stream to see if the receiver (Rx) can recover the data correctly. Simply looping the transmitter (Tx) signal back to the receiver (Rx), however, may not be a viable option since this conventional technique may miss out on testing this important attribute of the receiver (Rx) because the jitter in loopback mode is typically minimal, if present at all.

Figure 3:
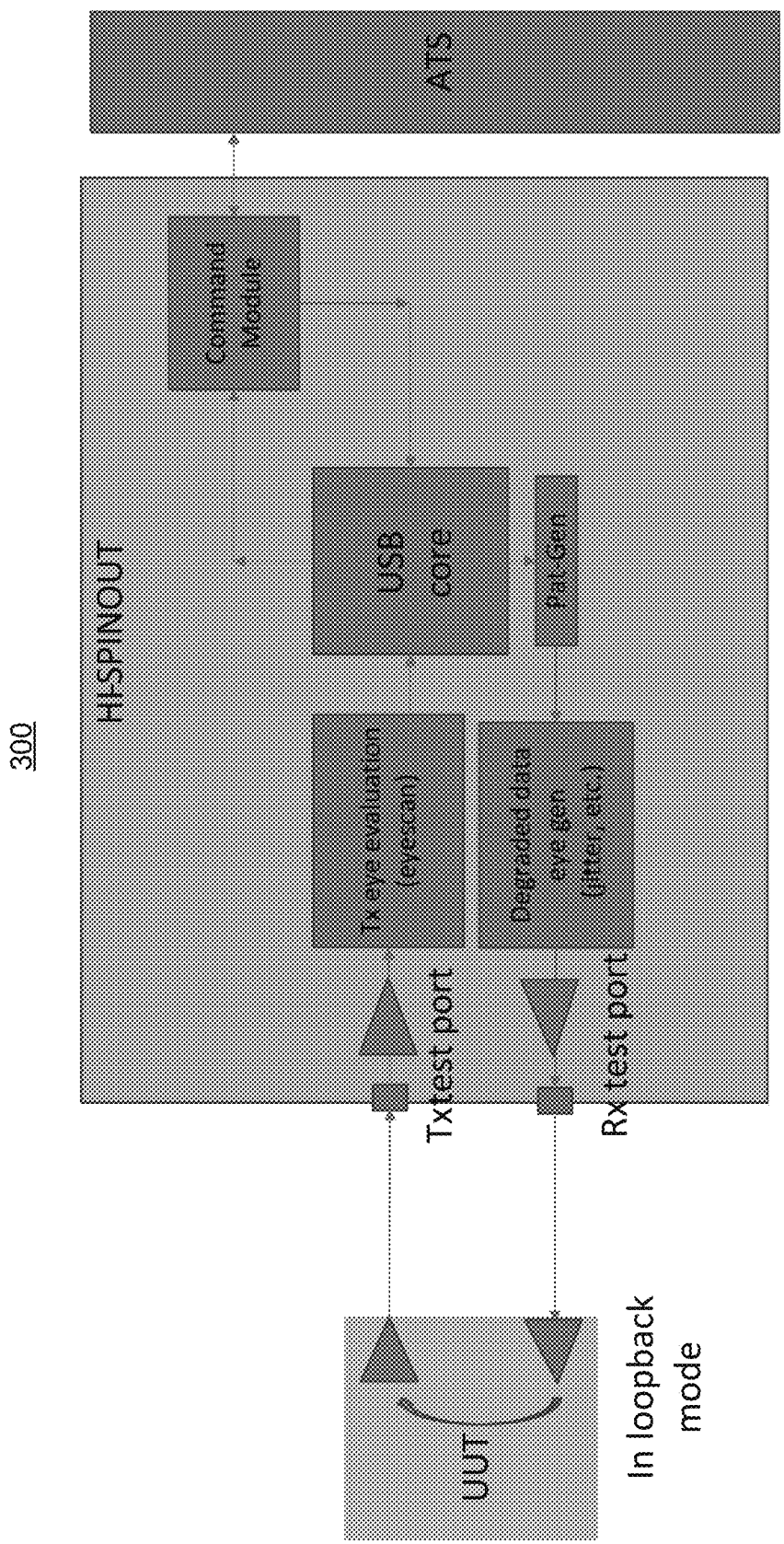
FIG. 3 illustrates a block diagram of a stress test configuration, according to an example.

FIG. 3 illustrates a block diagram 300 of a stress test configuration, according to an example. In some examples, the block diagram 300 may represent a stress test configuration for a serializer-deserializer (SerDes) circuit. As shown in FIG. 3, test instrumentation, such as an Automatic Test System (ATS), may be connected to a test subsystem, such as a serializer-deserializer (SerDes) test subsystem (e.g., labeled as HI-SPINOUT), which in turn may be connected to a Unit Under Test (UUT).

It should be appreciated that there may be a mechanism to enable communications between the Automatic Test System (ATS) and Unit Under Test (UUT). In some examples, this communication may be facilitated by a protocol engine, labelled as the "USB core," as shown in FIG. 3 and may be defined by any number of communications protocols used. One example of this protocol may be USB3.0, which in some scenarios, is used for high-speed serial communications. As such, this protocol engine may manage initialization of and/or facilitate handshaking with the Unit Under Test (UUT). The protocol engine may also accept one or more commands from the Automatic Test System (ATS). In some examples, these one or more commands may be used by the protocol engine to generate one or more test sequences for the UUT's transmitter (Tx) and/or receiver (Rx). To establish a loop for test, for instance, the UUT may be placed into an internal loopback mode. It should be appreciated that this may be available for most serializer-deserializer (SerDes) protocols. The internal loopback mode, for example, may help facilitate analysis and verification of signals coming into the UUT's Rx. Thus, in this stress test configuration, a signal may be communicated from the Automatic Test System (ATS) to the Unit Under Test (UUT) and be returned to the ATS for verification.

Any proper test may include establishing a link with signals operating well-within specification between the Automatic Test System (ATS) and the Unit Under Test (UUT). Once this connection is successfully established and verified, and normal operation is confirmed, the signal may be degraded by injecting jitter. In some examples, the injected jitter may then be tested to determine any potential error tolerance or intolerance of the Rx.

It should be appreciated that conventional solutions generally involve designing very sensitive clock generation circuits as part of the original system. Often, this kind of jitter generation is an intrusion into the design that hampers original system requirement of generating a stable clock for reliable system function. As a result, conventional systems and techniques may prove to be ultimately impractical. By contrast, the systems and methods described herein may provide a testing technique using jitter injection with no impact to current system operation. In some examples, this may include using existing circuitry normally associated with the run-time functionality of the serializer-deserializer (SerDes) circuitry itself as a method to inject tightly controlled and measurable amounts of jitter into the data signals transmitted (and received).

Figure 4:
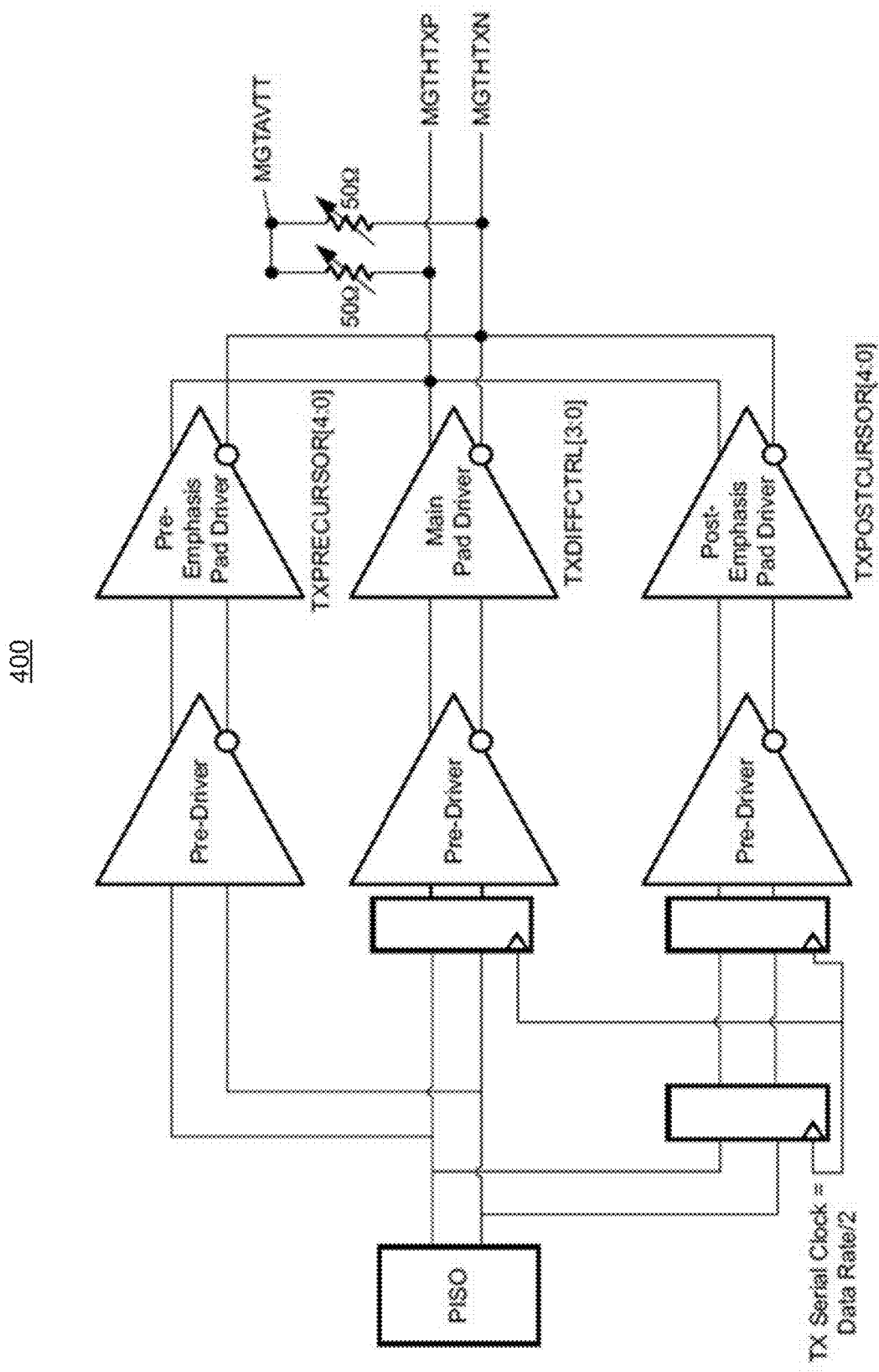
FIG. 4 illustrates a diagram of a pre- and post-emphasis circuit for jitter injection, according to an example.

FIG. 4 illustrates a diagram 400 of a pre- and post-emphasis circuit for jitter injection, according to an example. As shown, the diagram 400 depicts one or more pre-emphasis and post-emphasis circuits. It should be appreciated that the systems and methods described herein may take advantage of an existing circuit in serializer-deserializer (SerDes) configurations, which may move edges of the Tx signal using the one or more pre-emphasis and post-emphasis circuit. In some examples, these circuits may help enhance high frequency components of a signal so that the signal arriving at the Rx end may be more optimally equalized.

Figure 5:
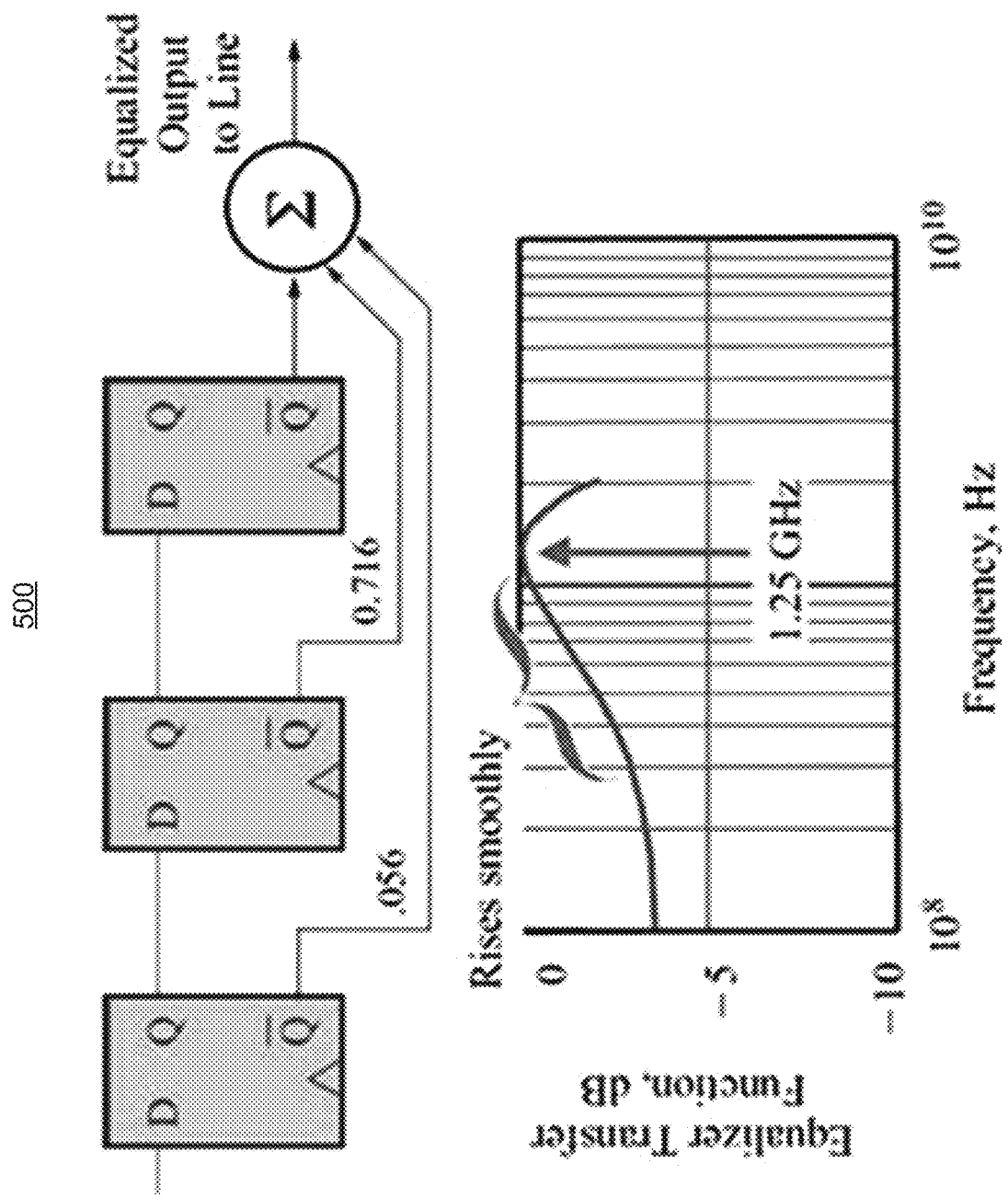
FIG. 5 illustrates a schematic of operating principles for a pre- and post-emphasis circuit for jitter injection, according to an example.

To help illustrate and explain these benefits, FIG. 5 illustrates a schematic of operating principles for a pre- and post-emphasis circuit for jitter injection, according to an example. In normal operation, for example, a copy of the same data may be clocked out using different phases of the clock and these copies may then be added together. It should be appreciated that the magnitude of these additive signals may differ (e.g., fractions labelled on the Qbar outputs in the diagram indicate the multiplier to each signal), meaning a different waveform may be provided from each of these. The net result may be that a high frequency (or range of high frequencies) portion of the source signal is emphasized. As this signal propagates down various transmission media (e.g., cables and connectors), higher frequency components may be attenuated. In some situations, this pre- and post-emphasis may result in a flatter response over any given data signal frequency range. This may also result in a more accurate signal being received. It should be appreciated that this may be achieved using this circuitry that may already exist within the transmitter (Tx) driver circuit, providing flexibility, compatibility, and cost-effectiveness. Accordingly, repurposing this circuit as a jitter injector may provide a host of other benefits and advantages.

Figure 6:
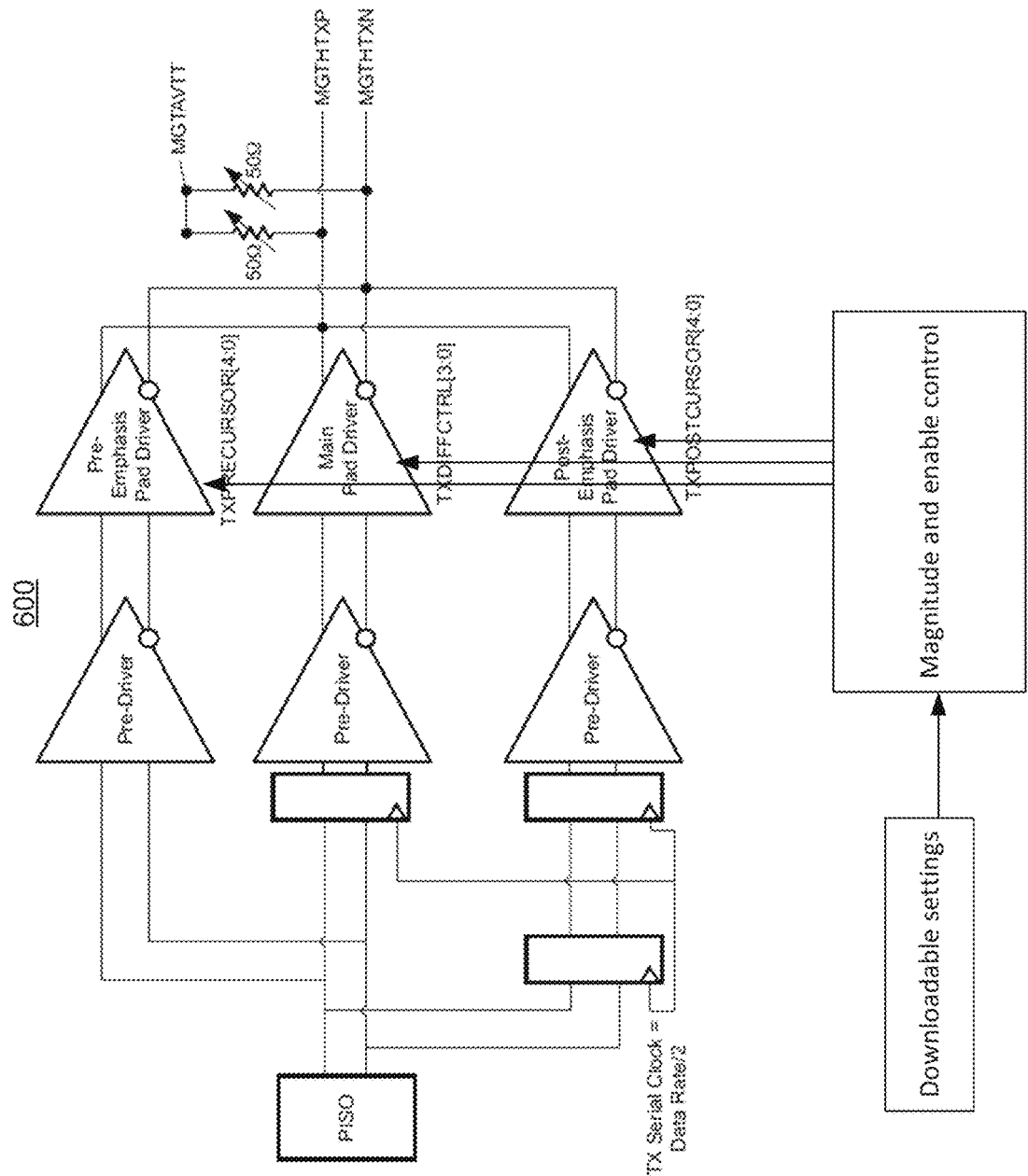
FIG. 6 illustrates a diagram of a pre- and post-emphasis circuit for jitter injection, according to another example.

FIG. 6 illustrates a diagram of a pre- and post-emphasis circuit for jitter injection, according to another example. Instead of boosting the high frequency components, they may be further attenuated. This may result in adding more jitter to any given signal stream. This may also be a direct approach of jitter injection, without modifying a clocking circuit or power supply. In some examples, additional circuits may include digital logic and may be readily synthesized in any digital design, for example, a field programmable gate array (FPGA) or high performance serializer-deserializer (SerDes) circuit. Both random and/or periodic jitter may be inserted with some small changes or alterations in any given logic control to the emphasis circuits. In some examples, settings for the desired jitter may be designed to be under external control. This may allow a magnitude and phase shift of the jitter to be precisely controlled and accurately repeated making this approach an ideal jitter injection mechanism for various applications, including test stimuli and measurements.

FIGS. 7A-7B illustrate eye diagrams 700A-700B with and without jitter injection, according to an example. In the absence of jitter, the eye's blue region may be larger indicating that the signals' edges are not moving back and forth very much (i.e., there is limited jitter), as shown in eye diagram 700A. When the jitter increases, and the back and forth motion of the signal edges increases, the blue region may shrink, as shown in eye diagram 700B. This reduced data eye may still have sufficient data differentiation for a good receiver circuit to re-extract the data. Increasing the jitter incrementally may also allow an amount of jitter that will disable proper transmission (i.e., when the blue portion of the eye diagram in FIG. 7B shrinks or disappears) to be measured. Knowing the amount of jitter that is required to degrade correct transmission may help ascertain the circuit's jitter tolerance, which may be an important system speed and quality metric, as described herein.

It should be appreciated that the techniques described herein may presume an existing circuit containing pre-emphasis and post-emphasis circuitry as illustrated in FIG. 6. In a normally functioning circuit, voltages applied at these points may be used to optimize signal transmission quality. The optimal operation values may need to be determined and stored because they may be used to guide the jitter injection as well as determining the operating range of the transceiver (i.e., what magnitude of jitter will be tolerated).

Using the systems and methods described herein, the UUT, for example, may be augmented by a high speed 10 test adapter with the capability of increasing and decreasing the voltage applied to the pre-emphasis and post-emphasis stages in arbitrarily small steps and independent of one another. Additionally, the high speed 10 test adapter has the capability of capturing the system response to pre-emphasis and post-emphasis changes and measuring them. One way to accomplish this is for the high speed 10 test adapter to capture that response as an eye diagram or equivalent and perform some data analysis to determine the open area of the eye and whether that open area meets the transmission requirements of the system. With that in place, the method may involve any number of actions, such as those described below in FIG. 8.

Figure 8:
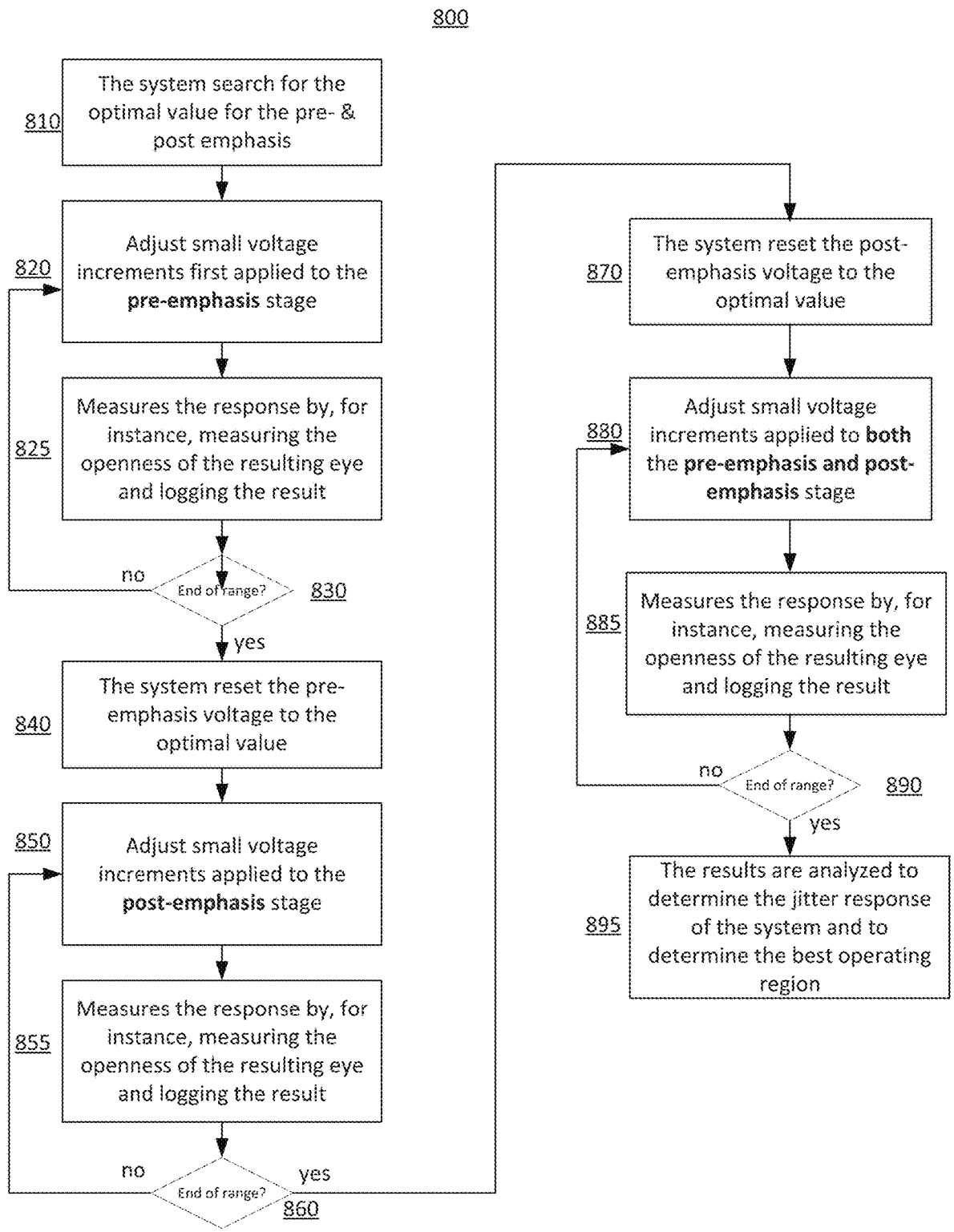
FIG. 8 illustrates a method for providing jitter injection, according to an example.

FIG. 8 illustrates a flow chart of a method 800 for jitter injection, according to an example. The method 800 is provided by way of example, as there may be a variety of ways to carry out the method described herein. Although method 800 is primarily described as being useful for the system 500 of FIG. 5 and/or the system 600 of FIG. 6, the method 800 may be executed or otherwise performed by one or more processing components of another system or a combination of systems. Each block shown in FIG. 8 may further represent one or more processes, methods, or sub-routines, and one or more of the blocks may include machine readable instructions stored on a non-transitory computer readable medium and executed by a processor or other type of processing circuit to perform one or more operations described herein.

At 810, as part of the initialization process, the system may automatically optimize the pre- and post-emphasis circuit settings. In some examples, these settings may be configured to achieve one or more scenarios to compensate for the operating environment (e.g., loading, cables, temperature, voltage, etc.). It should be appreciated that this process may involve a tuning process that may be unique and adaptable to each application environment.

At 820 and 825, one or more settings of the pre-emphasis circuit may be changed from this optimally tuned setting from the initialization process. For example, there may be a corresponding change in an eye diagram waveform, e.g., probably setting a slight degradation. By collecting and noting this change versus a digital setting, a relationship may be observed or generated. It should be appreciated that 820 and 825 may be repeated, as needed or determined, this for every range of available settings, at 830.

At 840, one or more pre-emphasis circuit may be reset to its original optimal value.

At 850 and 855, the post-emphasis circuit may be adjusted from this optimal value and again, collect and note the behavioral change as each setting is varied. Similar to above, it should be appreciated that 850 and 855 may be repeated, as needed or determined, this for every range of available settings, at 860.

At 870, most or all parameters may be reset, e.g., to optimal values

At 880 and 885, the pre-emphasis and post emphasis circuits may be adjusted to see any effects of their changes, again, stepping through the full range of these settings at 890

At 895, armed with the data collected in the previous steps, settings may be adjusted for both pre- and post-emphasis, e.g., that will result in the best eye diagram result for the jitter injection testing.

It should be appreciated that a test instrument, as used and described herein, may include a variety of internal or external components. For instance, the test instrument may be connected to a network (e.g., an optical network) at any desired test point (TP) to measure signals transmitted in any system or over any network. The test instrument may also include one or more ports. In some examples, the ports may be used to connect to one or more test points (TPs). It should be appreciated that these ports may include an adapter interface to test any system, transmitter, and/or receiver. In some examples, the ports may include coaxial RF cable connectors, as well as other non-cable ports, for example, to connect to a computer or to an external display, such as, but not exclusively, one or more USB ports, telephone, Ethernet, optical, and the like.

The test instrument may also include a telemetry interface for connecting to a telemetry channel, such as a WiFi interface, Bluetooth interface, cellular interface or another network interface. The telemetry interface may function as an additional communication channel. For example, the test instrument may connect to any number of remote devices via the telemetry interface.

It should be appreciated that the test instrument for performing tests and measurements using a transceiver may include a user interface which may include a keypad and display. For example, the display may include a touch screen display or other display. In some examples, a user (e.g., a technician) may interact with the test instrument via the user interface to enter information, select operations, view measurements, examine signal profiles, communicate with other devices, etc.

A data storage component may also be found in the test instrument. The data storage may store any information used by the test instrument and may include memory or another type of known data storage device. The data storage may store data, power level measurements and/or any other measurements or data used by the test instrument. The data storage may include a non-transitory computer readable medium storing machine-readable instructions executable by processing circuit to perform various actions or operations of the test instrument.

A transmission circuit may include a circuit for sending test signals into the network to perform various tests. The transmission circuit may include, among other things, encoders, modulators, and other known components for transmitting signals in the network. A receiver circuit may include components for receiving signals from the network. The transmission circuit and/or the receiver circuit may also include other components, such as a demodulator, a decoder, an ADC, and/or other circuit components or elements.

The processing circuit in the test instrument may include any suitable hardware to perform the operations of the test instrument described herein. The hardware of the test instrument, including the processing circuit, may include at least one of hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument described herein may be performed by the processing circuit or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. It should be appreciated that the test instrument may also include components other than what is shown. It should be appreciated that the processing circuit may provide any number of algorithms, for example, to analyze an output signal quality measurement based at least in part on an eye diagram, determine an optimal signal output by selecting pre- and post-emphasis values that yield an optimal eye diagram, control a controller to vary the amount of applied pre-emphasis or post-emphasis, determine an optimal operating range for the serializer-deserializer (SerDes) circuit, etc.

For example, the processing circuit may perform additional functions and features associated with analysis, control, and/or measurement. In some examples, the processing circuit may algorithmically analyze the output signal quality measurement based at least in part on an eye diagram. Furthermore, the processing circuit may determine an optical signal output by selecting the pre- and post-emphasis values that yield the optimal eye diagram. In some examples, the processing circuit may algorithmically controlled the controller to vary the amount of pre-emphasis or post emphasis applied. In some examples, the processing circuit may also algorithmically determine an optimal operating range for the serializer-deserializer (SerDes) circuit.

It should be appreciated that to "algorithmically" determine, measure, analyze, or control the parameters, as described herein, the processing circuit may be configured in any of a number of ranges or patterns. For instance, starting with a setting at a mid-point (e.g., 5 in a range of 5) of the possible adjustment range, a known or predetermined pattern may be transmitted to the other side. If the other side received it correctly, it will be acknowledged, in which case the setting to one side may be moved or adjusted until the pattern is no longer received correctly. This may therefore represent one end of the limit (e.g., 3). Now, the setting to the other side may be adjusted or configured to find the limit to the other side (e.g., 9). Then, the setting to mid-point of these limits (in our case here, 6) may be made. This may provide a maximum margin should there be some change in the environment, (e.g., temperature, sporadic noise, twisting of cables, etc.). In some examples, jitter characterization may likely then move closer to this limit (e.g., 4 or 8), but yet not cross over them (e.g., 3 or 9). In other words, this configuration for "algorithmic adjustment" may provide just enough jitter to see the pattern pass through for a good receiver (Rx). But with a bad or less-than-optimal receiver (Rx), the pattern at this marginal setting may not be seen or recognized.

As mentioned above, the test instrument, among other things, may be used for performing any number of tests or measurements for the optical telecommunications network and/or optical products, using the transceiver, as described herein. It should be appreciated that various settings may be involved in configuring the test instrument and/or the transceiver to perform the tests and measurements described herein. These settings and configurations, when done appropriately, may help ensure proper operation of these system components. The systems and methods described herein may optimize these settings and configurations for the examples below so that users may be able to perform the tests and measurements in an efficient and expedient manner.

It should be appreciated that the test instrument and transceivers may provide other various tests and measurements that may or may not be shown above. For example, depending on various configurations and settings, other tests and measurements may also be provided. For example, these may include may evaluate transceiver performance, various compliance tests, which may or may not involve testing and validating pattern sensitivity and crosstalk, stress dynamic skew, jitter, receiver sensitivity, stress communication bus with optics module (MDIO/I2C), etc. It should be appreciated that, in some examples, various equipment or protocols may be used to measure frame loss, out-of-sequence frames, latency, and/or packet jitter. Having optimal test parameters and settings may increase testing efficiencies and minimize expense. Other various tests may also be performed by the test instrument and transceiver.

In some examples, some transceivers may require additional adjustments to various settings or parameters. In this scenario, the test instrument may automatically (or semi-automatically) run through one or more custom mode settings. In this way, the test instrument may provide a more granulated way for diagnosing the optical transceiver and potentially isolate problematic issues, which is highly important with the high volume of cables and optics that exist in various networks and data centers.

As mentioned above, there may be numerous ways to perform the tests and measurements. Although the description used herein provided may offer one solution, it should be appreciated that these are examples and other various solutions may also be provided.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results.

It should be appreciated that the systems and methods described herein may facilitate more reliable and accurate tests and measurements, or increase the functionality of transceivers. It should also be appreciated that the systems and methods, as described herein, may also involve use of other transceivers or other components not shown or described. For example, these may include external processors, counters, analyzers, computing devices, and other measuring devices, systems, or elements. In some examples, this may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components described herein may be provided as multiple components, and vice versa, to perform the functions and features described herein. It should be appreciated that the components of the systems and methods described herein may operate in partial or full capacity, or it may be multiplied or removed entirely. It should also be appreciated that analytics and processing techniques described herein with respect to the tests and measurements, for example, may also be performed partially or in full by other various components of the overall systems.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more applications that utilize data from the measurement or other communicatively coupled system.

The various components, circuits, elements, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to test and measurement systems, it should be appreciated that the systems and methods described herein may also be used in other various systems and other implementations. For example, these may include cable, DSL, telecommunication, or other high speed data transmission networks, systems, devices, elements, or components, particularly those that may use any number of (pluggable) transceivers. In fact, there may be numerous other applications in communication networks and systems that could employ the systems and methods as well.

It should be appreciated that the systems and methods described herein may also be used to help provide, directly or indirectly, measurements for distance, angle, rotation, speed, position, wavelength, transmissivity, and/or other related optical measurements. For example, the systems and methods described herein may allow for a high resolution measurements using an efficient and cost-effective design concept and improved compatibilities. Accordingly, the systems and methods described herein may provide mechanical simplicity and adaptability to small or large, as well as existing test and measurement systems and methods. Ultimately, the systems and methods described herein may increase resolution, minimize complexities, reduce costs, and improve measurement efficiencies.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
a serializer-deserializer (SerDes) circuit having pre-emphasis circuit and a post emphasis circuit;
a controller to apply specific and varying amounts of pre-emphasis and post-emphasis; and
a jitter injector to inject jitter into the serializer-deserializer (SerDes) circuit based on the applied pre-emphasis and post-emphasis, wherein the jitter is inserted randomly or periodically.

2. The system of claim 1, wherein the jitter comprises small changes or alternations based on a logic control of either the pre-emphasis circuit or the post emphasis circuit.

3. The system of claim 1, wherein settings for injected jitter is designed to be under external control, where the settings allow control of at least one of magnitude, phase shift, or repetition.

4. The system of claim 1, further comprising a measurement circuit to measure an output signal quality.

5. The system of claim 4, wherein the measurement circuit measures the output signal quality simultaneously while the amount of pre-emphasis and post-emphasis is varied.

6. The system of claim 4, further comprising a monitor to monitor the amount of pre-emphasis and post-emphasis applied for the measured output signal quality measured.

7. The system of claim 4, wherein the output signal quality measurement is algorithmically analyzed based at least in part on an eye diagram.

8. The system of claim 7, wherein an optimal signal output is determined by selecting the pre- and post-emphasis values that yield the optimal eye diagram.

9. The system of claim 1, wherein the controller is algorithmically controlled to vary the amount of pre-emphasis or post emphasis applied.

10. The system of claim 1, wherein an optimal operating range for the serializer-deserializer (SerDes) circuit is algorithmically determined.

11. A method for providing jitter injection, comprising:
providing a serializer-deserializer (SerDes) circuit having a pre-emphasis circuit and a post emphasis circuit;
applying, using a controller, specific and varying amounts of pre-emphasis and post-emphasis; and
injecting jitter, randomly or periodically, into the serializer-deserializer (SerDes) circuit based on the applied pre-emphasis and post-emphasis.

12. The method of claim 11, further comprising measuring measure an output signal quality.

13. The method of claim 12, wherein the output signal quality is measured simultaneously while the amount of pre-emphasis and post-emphasis is varied.

14. The method of claim 12, further comprising monitoring the amount of pre-emphasis and post-emphasis applied for the measured output signal quality measured.

15. The method of claim 12, wherein the output signal quality measurement is algorithmically analyzed based at least in part on an eye diagram.

16. The method of claim 15, wherein an optimal signal output is determined by selecting the pre- and post-emphasis values that yield the optimal eye diagram.

17. The method of claim 11, wherein the controller is algorithmically controlled to vary the amount of pre-emphasis or post emphasis applied.

18. The method of claim 11, wherein an optimal operating range for the serializer-deserializer (SerDes) circuit is algorithmically determined.

19. A non-transitory computer-readable storage medium having an executable stored thereon, which when executed instructs a processor to:
   provide a serializer-deserializer (SerDes) circuit having a pre-emphasis circuit and a post emphasis circuit;
   apply specific and varying amounts of pre-emphasis and post-emphasis; and
   inject jitter, randomly or periodically, into the serializer-deserializer (SerDes) circuit based on the applied pre-emphasis and post-emphasis.

* * * * *